(12) United States Patent
Schlüsselbauer

(10) Patent No.: US 11,814,900 B2
(45) Date of Patent: Nov. 14, 2023

(54) DEVICE FOR SECURING A RUNG IN A CONCRETE WALL

(71) Applicant: Ulrich Schlüsselbauer, Altenhof am Hausruck (AT)

(72) Inventor: Ulrich Schlüsselbauer, Altenhof am Hausruck (AT)

(*) Notice: Subject to any disclaimer, the term of this patent is extended or adjusted under 35 U.S.C. 154(b) by 637 days.

(21) Appl. No.: 16/628,884

(22) PCT Filed: Jun. 22, 2018

(86) PCT No.: PCT/AT2018/050015
§ 371 (c)(1),
(2) Date: Jan. 6, 2020

(87) PCT Pub. No.: WO2019/006480
PCT Pub. Date: Jan. 10, 2019

(65) Prior Publication Data
US 2020/0224496 A1 Jul. 16, 2020

(30) Foreign Application Priority Data
Jul. 6, 2017 (AT) .............................. A 50562/2017

(51) Int. Cl.
*E06C 9/04* (2006.01)
*E02D 29/12* (2006.01)
(Continued)

(52) U.S. Cl.
CPC .............. *E06C 9/04* (2013.01); *E02D 29/122* (2013.01); *F16B 13/068* (2013.01);
(Continued)

(58) Field of Classification Search
CPC ........ F16B 13/00; F16B 21/086; F16B 13/08; F16B 9/05; F16B 13/128; F16B 13/122;
(Continued)

(56) References Cited

U.S. PATENT DOCUMENTS 637,141 A * 11/1899 Marx .................... F16B 7/0446
411/460
1,083,697 A * 1/1914 Neptune ................... F16B 5/04
411/525
(Continued)

FOREIGN PATENT DOCUMENTS

AT          392663 B      5/1991
DE        3603255 A1      8/1987
(Continued)

OTHER PUBLICATIONS

English language Abstract for EP2362107 A2, Aug. 31, 2011.
(Continued)

*Primary Examiner* — Taylor Morris
(74) *Attorney, Agent, or Firm* — Tiajoloff & Kelly LLP

(57) ABSTRACT

A device has two anchor sleeves (3) in a concrete wall (2) accommodating two parallel anchor bolts (6) of a U-shaped step iron (1) form-fittingly. Between coupling parts formed by the anchor sleeves (3) and the anchor bolts (6), a detent assembly (7) has at least one detent tongue (8) sprung in the radial direction on one of the coupling parts (3, 6) and a detent recess (9) that receives the detent tongue (8) on the other coupling part (6, 3). A guide surface (15) for the detent tongue (8) is inclined in the peripheral direction and extends in the radial direction over the engagement depth of the detent tongue (8) adjoining the detent recess (9) at least in a peripheral direction.

20 Claims, 2 Drawing Sheets

Figure 2:
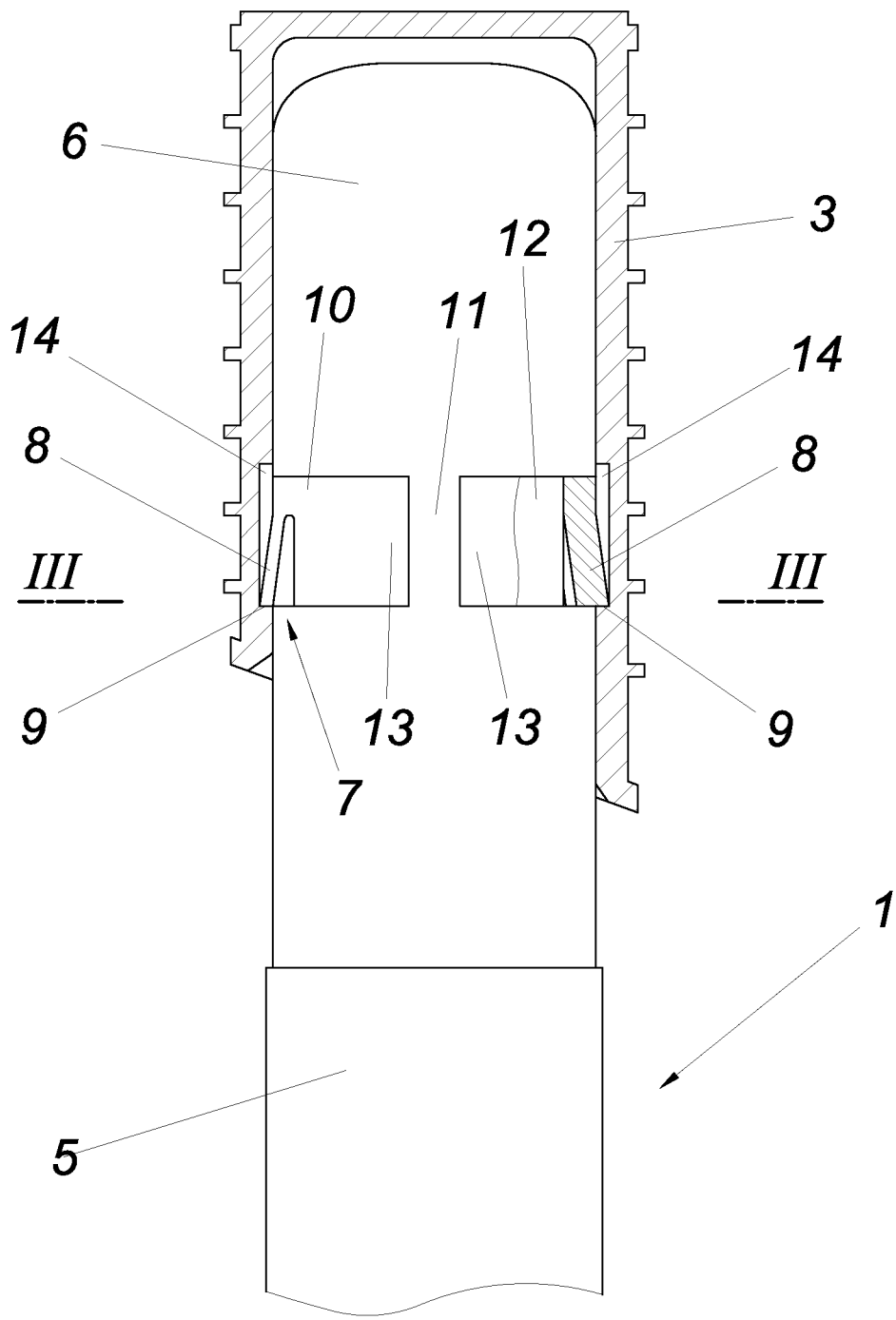

(51) Int. Cl.
  *F16B 13/06*   (2006.01)
  *F16B 13/08*   (2006.01)
  *F16B 21/08*   (2006.01)

(52) U.S. Cl.
  CPC ...... *F16B 13/0833* (2013.01); *F16B 13/0858* (2013.01); *F16B 21/08* (2013.01); *F16B 21/086* (2013.01)

(58) Field of Classification Search
  CPC ...... F16B 13/12; F16B 41/002; F16B 39/108; F16B 13/10; F16B 21/02; F16B 21/078; F16B 13/0833; F16B 21/08; F16B 13/068; F16B 13/066; F16B 13/0858; E21D 21/0026; E21D 21/0033; E21D 21/004; E06C 9/04; E04C 5/122; E04B 1/41; E04B 1/4114; E04B 1/415; E02D 29/122
  USPC .......................................... 411/352, 353, 508
  See application file for complete search history.

(56) References Cited

U.S. PATENT DOCUMENTS

| | | | | |
|---|---|---|---|---|
| 1,548,641 | A * | 8/1925 | Tomkinson | F16B 13/066 411/64 |
| 2,877,818 | A * | 3/1959 | Johnson | F16B 13/08 411/347 |
| 3,200,903 | A | 8/1965 | Marino | |
| 3,374,859 | A | 3/1968 | Dobert | |
| 3,455,201 | A * | 7/1969 | Ryder | F16B 21/086 411/15 |
| 3,468,091 | A * | 9/1969 | Gerhard | F16B 13/066 52/378 |
| 3,546,998 | A * | 12/1970 | Lerich | F16B 13/065 411/60.3 |
| 3,665,800 | A * | 5/1972 | Ryder | F16B 21/086 425/577 |
| 3,740,083 | A * | 6/1973 | Zenhausern | F16B 9/05 403/243 |
| 3,798,866 | A * | 3/1974 | Werstein | E04B 1/4121 52/707 |
| 4,714,391 | A * | 12/1987 | Bergner | B25B 31/00 411/54 |
| 4,810,145 | A | 3/1989 | Villas | |
| 4,869,342 | A * | 9/1989 | Borst | E06C 9/04 182/90 |
| 4,916,312 | A | 4/1990 | Ellis et al. | |
| 5,741,101 | A * | 4/1998 | Gulistan | F16B 21/086 411/107 |
| 5,924,831 | A * | 7/1999 | Ricks | B60R 21/2035 411/508 |
| 6,068,083 | A * | 5/2000 | Takahashi | E06C 7/081 182/92 |
| 6,116,837 | A | 9/2000 | Suhle | |
| 6,125,967 | A * | 10/2000 | Takahashi | E06C 7/081 182/129 |
| 6,315,077 | B1 * | 11/2001 | Peacock | E04G 15/061 182/92 |
| 6,688,826 | B2 * | 2/2004 | Agha | F16B 43/00 411/352 |
| 8,813,446 | B2 * | 8/2014 | Sladojevic | E04G 5/046 52/223.13 |
| 8,833,830 | B2 * | 9/2014 | Renke | F16B 2/241 296/146.7 |
| 9,133,871 | B2 * | 9/2015 | Schaeffer | F16B 13/065 |
| 9,347,478 | B2 * | 5/2016 | Yacobucci | F16B 21/08 |
| 10,030,380 | B2 * | 7/2018 | Merrick | F16B 13/06 |
| 11,067,109 | B2 * | 7/2021 | Horimizu | F16B 5/0664 |
| 11,401,961 | B2 * | 8/2022 | Nitschmann | F16B 12/24 |
| 2009/0133933 | A1 * | 5/2009 | Karpellus | E21D 21/0053 175/57 |
| 2013/0192038 | A1 | 8/2013 | Vullings | |
| 2016/0032955 | A1 * | 2/2016 | Chang | A47B 88/941 312/330.1 |
| 2016/0146239 | A1 * | 5/2016 | Nazzari | G09F 3/0317 70/232 |
| 2017/0240121 | A1 * | 8/2017 | Yon | F16B 21/086 |

FOREIGN PATENT DOCUMENTS

| | | | |
|---|---|---|---|
| DE | 19647589 C1 | 2/1998 | |
| EP | 0278995 A2 | 8/1988 | |
| EP | 2362107 A2 | 8/2011 | |
| FR | 2614921 A1 | 11/1988 | |
| JP | 60019833 A * | 2/1985 | |
| JP | H03-29541 U | 3/1991 | |
| JP | 2008075296 A | 4/2008 | |
| KR | 200403874 Y1 * | 12/2005 | E06C 9/02 |

OTHER PUBLICATIONS

Espacenet English-language Abstract JP 2008-075296 A, Apr. 3, 2008.

Espacenet English-language Abstract EP 0278995 A2, Aug. 24, 1988.

* cited by examiner

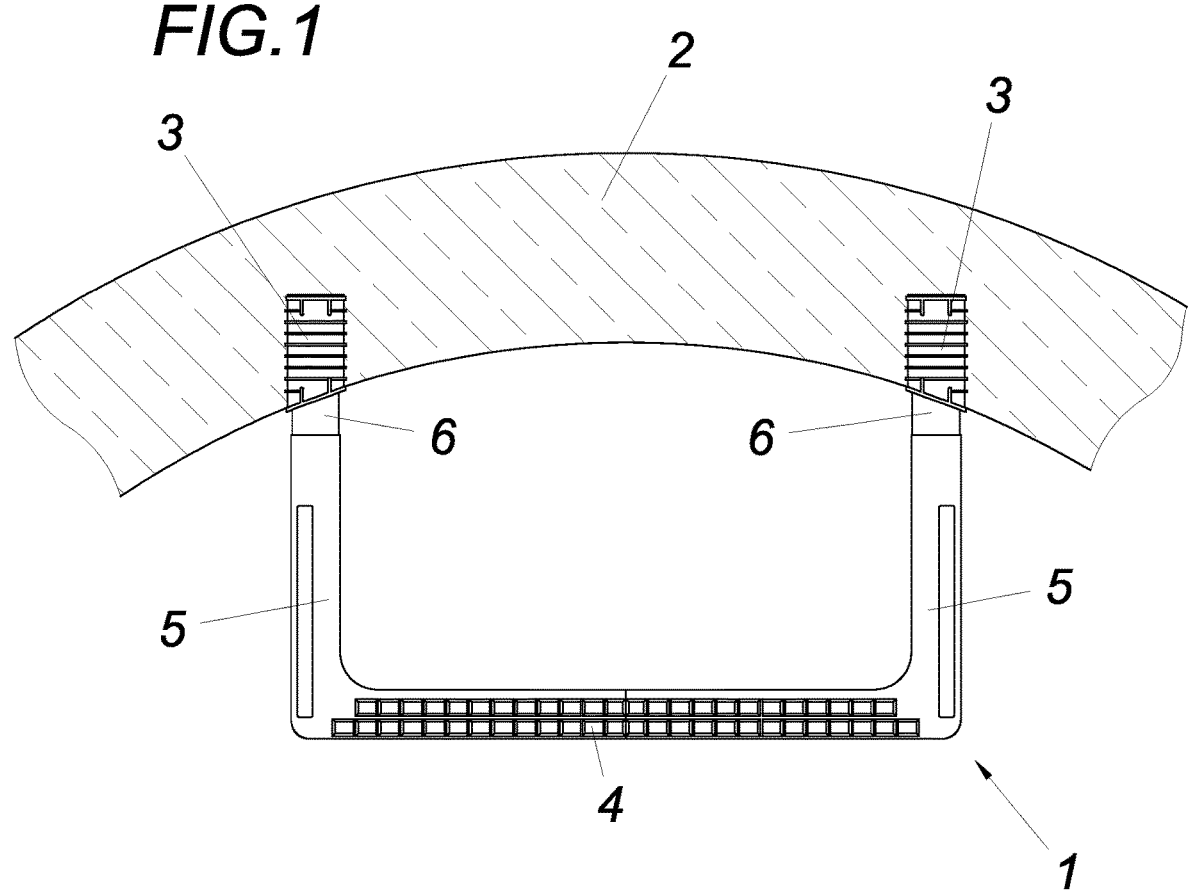
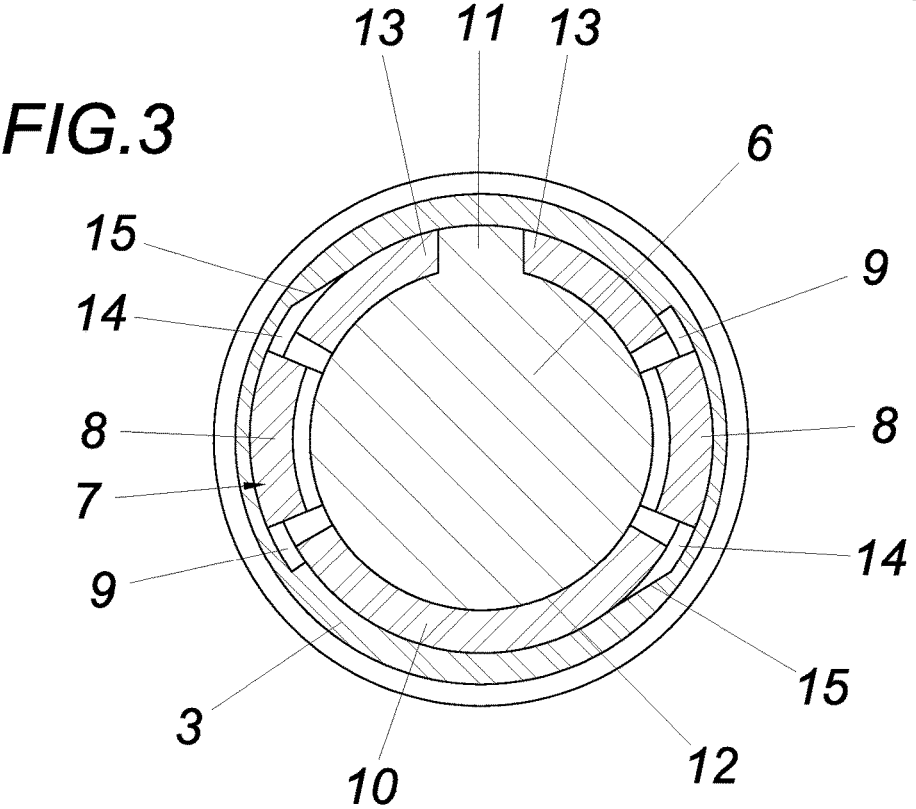

DEVICE FOR SECURING A RUNG IN A CONCRETE WALL

TECHNICAL FIELD

The invention relates to a device for fastening a step iron in a concrete wall, the device having two anchor sleeves provided in the concrete wall and accommodating two parallel anchor bolts of the U-shaped step iron form-fittingly.

PRIOR ART

In order to provide, for example, concrete shafts with step irons retrospectively, it is known to provide anchor sleeves in pairs in the shaft wall in order to accommodate the parallel anchor bolts of the U-shaped step irons protruding towards the shaft wall, with the step irons, as necessary, being driven into the preassem bled anchor sleeves of the shaft wall with the anchor bolts to the fore. So that, on the one hand, the necessary pull-out resistance of the anchor bolts from the anchor sleeves in the shaft wall can be ensured and, on the other hand, a comparatively simple possibility is created for replacing damaged step irons, it has already been proposed (AT 392 663 B) to profile the anchor bolts with a screw thread, which, as the anchor bolts are being driven into the plastic anchor sleeves, brings about a material displacement in the turns of the thread, whereby a high pull-out resistance can be achieved. In order to replace a step iron, the tread bar is severed, such that the two anchor bolts can each be rotated about their axis, which makes it possible to unscrew the anchor bolts from the anchor sleeves on account of the screw thread. A disadvantage, however, is that the tread irons are exposed to high impact loads in order to drive the anchor bolts into the anchor sleeves, because in order to ensure the necessary pull-out resistance, the plastic of the anchor bolts must be plastically deformed as the threaded portion of the anchor bolts is being driven into the anchor sleeves. There is thus the risk of mechanical damage to the tread iron, wherein provided plastic coatings of the tread bars are often particularly at risk.

DISCLOSURE OF THE INVENTION

The object of the invention thus lies in designing a device for fastening step irons in a concrete wall such that, whilst maintaining a secure hold of the step irons in the concrete wall, during assembly only comparatively low forces are to be applied to the step irons, without detriment to the possibility of simple replacement.

Proceeding from a device of the kind described in the introduction, the invention achieves the stated object in that, between the coupling parts formed on the one hand by the anchor sleeves and on the other hand by the anchor bolts, a detent assembly formed from at least one detent tongue which is sprung in the radial direction is provided on one of these coupling parts and formed from a detent recess which receives the detent tongue is provided on the other coupling part, and in that a guide surface for the detent tongue inclined in the peripheral direction and extending in the radial direction over the engagement depth of the detent tongue adjoins the detent recess at least in a peripheral direction.

Since a detent assembly comprising a detent tongue which is sprung in the radial direction and a detent recess receiving the detent tongue is provided between the anchor sleeves provided in the concrete wall and the anchor bolts of the step iron engaging in the anchor sleeves, the pull-out resistance of the anchor bolts from the anchor sleeves is predefined structurally by the detent assembly, which forms an axial stop, effective in the pull-out direction, for the detent tongue engaging behind this stop, such that effective protection against pull-out is achieved by the stop of the detent recess and can only be overcome if the detent tongue is destroyed. The force required to insert the anchor bolts into the anchor sleeves is determined here substantially by the force that is necessary to radially displace the detent tongue against its spring force and is therefore independent of a predefined pull-out resistance. It must merely be ensured that the detent tongue, as the anchor bolts are inserted into the anchor sleeves, can be radially displaced far enough relative to the coupling part receiving it in order to slide along the wall of the coupling part comprising the detent recess as far as the detent recess.

In spite of the detent assembly preventing the anchor bolts from being pulled out from the anchor sleeves, a simple replacement of the step irons is possible because the detent recess tapers off at least in a peripheral direction into a guide surface for the detent tongue inclined in the peripheral direction and extending in the radial direction over the engagement depth of the detent tongue. This means that, once the tread bar of the step iron has been severed, the anchor bolts can be rotated about their axis in the direction of the guide surface, with the effect that the detent tongue moves out of the detent recess in the peripheral direction and in so doing is displaced against its spring force along the guide surface, radially relative to the associated coupling part, so as to then be able to pull out the anchor bolts from the anchor sleeve when the detent assembly is released.

If the detent recess forms a groove extending over a peripheral region of the associated coupling part, which groove terminates at least at one end face by a guide surface for the detent tongue, particularly simple constructions conditions are thus provided. The groove extending over a peripheral region not only forms, together with a groove wall, an axial stop for the detent tongue, but also guides the detent tongue in the peripheral direction to the guide surface inclined in the peripheral direction, along which guide surface the detent tongue is moved out laterally from the detent recess. The detent tongue could be formed as part of the anchor sleeve or the anchor bolt. Advantageous construction conditions are provided, however, if the at least one sprung detent tongue is provided on an open spring ring that is inserted non-rotatably into a peripheral groove of the associated coupling part, because in this case the material properties of the sprung detent tongue, inter alia, can be selected independently of the material properties of the associated coupling part. It must, however, be ensured that the spring ring, which can be easily inserted into the peripheral groove on account of its spring properties, is supported non-rotatably relative to the associated coupling part, because otherwise a relative rotation between the detent tongue and the detent recess in order to release the detent assembly could not be assured. In order to prevent rotation, the peripheral groove may be interrupted by an axial bar, which forms an end-face stop for the two ends of the open spring ring.

For improved axial support of the anchor bolts in the anchor sleeves, the spring rings may have two detent tongues arranged diametrically opposed to one another and engaging in a detent recess each, such that the axial supporting forces are divided across both spring tongues.

Although it is irrelevant for the effect of the detent assembly which of the two coupling parts is provided with the detent tongue or the detent recess, an embodiment in which the detent tongues are associated with the anchor bolts and the detent recess is associated with the anchor sleeves must be preferred.

BRIEF DESCRIPTION OF THE INVENTION

The subject matter of the invention is depicted by way of example in the drawings, in which FIG. 1 shows a step iron fastened in a concrete wall with the aid of a device according to the invention in a section through the anchor sleeves, FIG. 2 shows an anchor sleeve with inserted anchor bolt in an axial section on a larger scale, and FIG. 3 shows a section along line III-III of FIG. 2.

EMBODIMENT OF THE INVENTION

As is clear from FIG. 1, two anchor sleeves 3 are moulded for each step iron 1, into which sleeves the step iron 1 is inserted, for subsequent fastening of a step iron 1 in a concrete wall 2, for example of a shaft ring. The U-shaped step iron 1, which forms a tread bar 4 having two protruding limbs 5, has two parallel anchor bolts 6 at the limb ends for anchoring into the anchor sleeves 3. This anchoring is achieved via a detent assembly 7 between the anchor sleeve 3 and the anchor bolt 6 engaging in the anchor sleeve 3. The detent assembly 7, in accordance with FIGS. 2 and 3, comprises two sprung detent tongues 8, which are diametrically opposed to one another and latch in sprung fashion into detent recesses. Although the detent tongues 8 are preferably associated with the anchor bolts 6 and the detent recesses 9 are preferably associated with the anchor sleeves 3, this is not mandatory, because in a kinematic reversal the detent tongues 8 and the detent recesses 9 may also belong to the other one of these coupling parts respectively.

In order to create simple construction preconditions, the detent tongues 8 are provided on an open spring ring 10 that is separate from the anchor bolts 6 and is inserted into a peripheral groove 12 of the anchor bolt 6, the peripheral groove being interrupted by an axial web 11, and is supported by its end-face ends 13 on the axial web 11 so as to be prevented from rotating in the peripheral direction. The detent recesses 9 for the detent tongues 8 are formed by grooves 14 extending over a limited peripheral region of the coupling sleeve 3, the grooves being adjoined at an end face by a guide surface 15, inclined in the peripheral direction, for the detent tongue 8. Since the incline of the guide surface 15 extends over the groove depth, as the anchor bolt 6 is rotated in the direction of the incline of the guide surfaces 15, the detent tongues 8 are pivoted against their spring force along the guide surfaces 15 out of the grooves 14 radially inwardly relative to the spring ring 10, such that the anchor bolts 6 can then be pulled from the anchor sleeves 3 when the detent assembly 7 is released. For this purpose, however, the tread bar 4 must have been severed beforehand, so that the anchor bolts 6 can be rotated by the remaining tread bar portion in the anchor sleeve 3.

To insert a step iron 1 into the anchor sleeves 3, the anchor bolts 6 with the spring rings 10 inserted non-rotatably merely have to be inserted into the anchor bolts 6 until the detent tongues 8 pivoted in relative to the anchor bolts at the time of insertion latch in sprung fashion into the detent recesses 9 and the anchor bolts 6 thus lock in the anchor sleeves 3 in a manner secured against an axial removal.

The invention claimed is:

1. A device for fastening a step iron in a concrete wall, said device comprising:

two anchor sleeves being supported and securingly moulded in the concrete wall;

the step iron being generally U-shaped and having two parallel anchor bolts each being inserted in and form-fittingly accommodated by a respective one of the anchor sleeves, each of the anchor sleeves and a respective one of the anchor bolts accommodated thereby forming a respective set of coupling parts, and a detent assembly between the coupling parts of one of the sets that includes at least one detent tongue that is sprung in a radial direction and is supported on one of the coupling parts of the set, and structure on the other coupling part of the set defining a detent recess that receives the detent tongue, and wherein said other coupling part has a guide surface that is engageable with the detent tongue and is inclined in a circumferential direction and extending in the radial direction over an engagement depth of the detent tongue, and said guide surface adjoins the detent recess at least in the circumferential direction.

2. A device according to claim 1, wherein the structure defining the detent recess defines a groove extending over a peripheral region of said other coupling part, wherein said groove terminates at least at one end face by the guide surface.

3. A device according to claim 2, wherein the at least one detent tongue is resilient and is supported on an open spring ring inserted non-rotatably into a peripheral groove of said other coupling part.

4. A device according to claim 3, wherein the peripheral groove is interrupted by an axial bar that forms an end-face stop for two ends of the open spring ring.

5. A device according to claim 4, the other coupling part has a second detent recess, and the open spring ring has another detent tongue arranged diametrically opposed to the detent tongue and each of the detent tongues engages in a respective one of said detent recesses.

6. A device according to claim 2, wherein the detent tongue is associated with the anchor bolt, and the detent recess is associated with the anchor sleeve.

7. A device according to claim 3, wherein the detent tongue is associated with the anchor bolt, and the detent recess is associated with the anchor sleeve.

8. A device according to claim 4, wherein the detent tongue is associated with the anchor bolt, and the detent recess is associated with the anchor sleeve.

9. A device according to claim 5, wherein the detent tongue is associated with the anchor bolt, and the detent recess is associated with the anchor sleeve.

10. A device according to claim 1, wherein the at least one detent tongue is resilient and is supported on an open spring ring inserted non-rotatably into a peripheral groove of said one of the coupling parts.

11. A device according to claim 10, wherein the peripheral groove is interrupted by an axial bar that forms an end-face stop for two ends of the open spring ring.

12. A device according to claim 11, the other coupling part has a second detent recess, and the open spring ring has another detent tongue arranged diametrically opposed to the detent tongue and each of the detent tongues engages in a respective one of said detent recesses.

13. A device according to claim 1, wherein the detent tongue is associated with the anchor bolt, and the detent recess is associated with the anchor sleeve.

14. A device according to claim 10, wherein the detent tongue is associated with the anchor bolt, and the detent recess is associated with the anchor sleeve.

15. A device according to claim 11, wherein the detent tongue is associated with the anchor bolt, and the detent recess is associated with the anchor sleeve.

16. A device according to claim 12, wherein the detent tongue is associated with the anchor bolt, and the detent recess is associated with the anchor sleeve.

17. A device for fastening a step iron in a concrete wall, said device comprising:
- two anchor sleeves being supported in the concrete wall;
- the step iron being generally U-shaped and having two parallel anchor bolts each form-fittingly accommodated by a respective one of the anchor sleeves, each of the anchor sleeves and a respective one of the anchor bolts accommodated thereby forming a respective set of coupling parts, and
- a detent assembly between the coupling parts of one of the sets that includes at least one detent tongue that is sprung in a radial direction and is supported on one of the coupling parts of the set, and structure on the other coupling part of the set defining a detent recess that receives the detent tongue, and
- wherein a guide surface engageable with the detent tongue and being inclined in a peripheral direction and extending in the radial direction over an engagement depth of the detent tongue adjoins the detent recess at least in the peripheral direction; and
- wherein the at least one detent tongue is resilient and is supported on an open spring ring inserted non-rotatably into a peripheral groove of said one of the coupling parts; and
- wherein the other coupling part has a second detent recess, and the open spring ring has another detent tongue arranged diametrically opposed to the detent tongue and each of the detent tongues engages in a respective one of said detent recesses.

18. A device according to claim 17, wherein the detent tongue is associated with the anchor bolt, and the detent recess is associated with the anchor sleeve.

19. A device for fastening a step iron in a concrete wall, said device comprising:
- two anchor sleeves being supported in the concrete wall;
- the step iron being generally U-shaped and having two parallel anchor bolts each form-fittingly accommodated by a respective one of the anchor sleeves, each of the anchor sleeves and a respective one of the anchor bolts accommodated thereby forming a respective set of coupling parts, and
- a detent assembly between the coupling parts of one of the sets that includes at least one detent tongue that is sprung in a radial direction and is supported on one of the coupling parts of the set, and structure on the other coupling part of the set defining a detent recess that receives the detent tongue, and
- wherein a guide surface engageable with the detent tongue and being inclined in a peripheral direction and extending in the radial direction over an engagement depth of the detent tongue adjoins the detent recess at least in the peripheral direction;
- wherein the structure defining the detent recess defines a groove extending over a peripheral region of said other coupling part, wherein said groove terminates at least at one end face by the guide surface; and
- wherein the at least one detent tongue is resilient and is supported on an open spring ring inserted non-rotatably into a peripheral groove of said one of the coupling parts; and
- wherein the other coupling part has a second detent recess, and the open spring ring has another detent tongue arranged diametrically opposed to the detent tongue and each of the detent tongues engages in a respective one of said detent recesses.

20. A device according to claim 19, wherein the detent tongue is associated with the anchor bolt, and the detent recess is associated with the anchor sleeve.

* * * * *